United States Patent
Hutchings et al.

(10) Patent No.: US 9,182,930 B2
(45) Date of Patent: Nov. 10, 2015

(54) PRINTER DRIVER AND APPLICATION DECOUPLING USING EVENT CENTRIC REGISTRATION MODEL

(75) Inventors: Justin Hutchings, Issaquah, WA (US); Frank Gorgenyi, Bremerton, WA (US); Feng Yue, Sammamish, WA (US); Darren Davis, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1003 days.

(21) Appl. No.: 12/966,841

(22) Filed: Dec. 13, 2010

(65) Prior Publication Data
US 2012/0147415 A1 Jun. 14, 2012

(51) Int. Cl.
*G06F 3/12* (2006.01)

(52) U.S. Cl.
CPC ............ *G06F 3/1207* (2013.01); *G06F 3/1224* (2013.01); *G06F 3/1259* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 5,604,843 | A | 2/1997 | Shaw et al. |
| 6,825,941 | B1 | 11/2004 | Nguyen et al. |
| 7,284,246 | B2 | 10/2007 | Kemp et al. |
| 7,493,327 | B1 | 2/2009 | Fenelon |
| 7,522,299 | B2 | 4/2009 | Nguyen et al. |
| 2002/0054313 | A1* | 5/2002 | Shimizu ................ 358/1.13 |
| 2003/0200289 | A1* | 10/2003 | Kemp et al. ............ 709/221 |
| 2003/0200427 | A1* | 10/2003 | Kemp et al. ............ 713/1 |
| 2006/0017948 | A1 | 1/2006 | Levin et al. |
| 2006/0106775 | A1 | 5/2006 | Kuhn et al. |
| 2006/0146353 | A1 | 7/2006 | Yue et al. |
| 2007/0027979 | A1 | 2/2007 | Emerson et al. |
| 2007/0127069 | A1* | 6/2007 | Steele et al. ........... 358/1.16 |
| 2008/0291483 | A1 | 11/2008 | Shimatani |
| 2010/0073724 | A1 | 3/2010 | Kurata |
| 2010/0188680 | A1 | 7/2010 | Xiao |

FOREIGN PATENT DOCUMENTS

| | | |
|---|---|---|
| CN | 1453696 A | 11/2003 |
| CN | 101657790 A | 2/2010 |
| EP | 1357467 A2 | 10/2003 |

OTHER PUBLICATIONS

Supporting Advanced Color in Print Drivers—Published Dec. 17, 2007; http://download.microsoft.com/download/a/f/7/af7777e5-7dcd-4800-8a0a-b18336565f5b/color-drv.docx.
Printing Overview—Retrieved Date: Sep. 7, 2010; http://msdn.microsoft.com/en-us/library/ms742418.aspx.
Chinese Office Action mailed Jan. 10, 2014 in CN Pat. App. No. 201110414199.9, 13 pages including Concise Explanation of Relevance and/or partial translation.
"Office Action and Search Report Issued in Chinese Patent Application No. 201110414199.9", Mailed Date: Aug. 13, 2014, 16 Pages.
"Third Office Action Issued in Chinese Patent Application No. 201110414199.9", Mailed Date: Feb. 15, 2015, 12 Pages.

* cited by examiner

*Primary Examiner* — Jeremiah Bryar
(74) *Attorney, Agent, or Firm* — Jim Banowsky; Judy Yee; Micky Minhas

(57) ABSTRACT

Some embodiments of the invention provide a printer user interface (UI) component configured to handle presentation of information to a user during printing operations. The printer UI component may de-couple the rendering and configuration functionality provided by a printer driver from the presentation of information to end users, thereby reducing the risk that applications may crash or hang due to printer driver malfunction. In some embodiments, a registry of events upon which information should be presented to the user is established, and the printer UI component may be registered for some or all of these events, so that when the specified events occur the printer UI component may be invoked to cause information to be presented to the user.

20 Claims, 5 Drawing Sheets

PRINTER DRIVER AND APPLICATION DECOUPLING USING EVENT CENTRIC REGISTRATION MODEL

FIELD OF INVENTION

This invention relates generally to device drivers, and more particularly to printer drivers.

BACKGROUND INFORMATION

A device driver is a body of software code that often enables one or more higher-level software applications to interact with a hardware device. Often, a device driver accepts generic commands from a higher-level application with which a user interacts, and translates the commands into lower-level commands that the printer device being driven is configured to process. By acting as a translator, the device driver can simplify the programming of higher-level applications, since those applications need not be programmed to issue commands in the lower-level languages that devices process. A device driver may also provide a standardized interface through which higher-level applications may invoke a device's functions.

A printer driver is a body of software code that enables higher-level applications to invoke the functions provided by a printer device. Typically, a printer driver provides functionality that may be broadly categorized as rendering, configuration and user experience functionality. Briefly, rendering functionality provided by a printer driver translates information that is generated when a print job is initiated to commands and data that comply with a page description language (PDL) that the printer device is configured to process. Configuration functionality enables a higher-level program to configure and view configuration aspects of a printer device, such as the paper sizes the printer device supports, whether color printing is supported, etc. User experience functionality manages the presentation of information by the printer device to a user during print operations, such as to let the user know that a print job has commenced or completed, that ink supplies are low, etc.

SUMMARY OF INVENTION

Applicant has appreciated several problems with conventional printer drivers. For example, printer drivers often malfunction while attempting to display information to a user during printing operations (e.g., via a status monitor, such as in the bottom right hand corner of the display, that indicates the amount of ink remaining, the start or completion of a print job, or a dialogue box that allows the user to enter a PIN number to commence printing, etc.). In this respect, in conventional systems, the code comprising a printer driver is loaded into the process of an application that initiates printing, so that the application actually executes the printer driver as part of its process. Printer driver code is commonly programmed in binary code by the printer manufacturer, so that the application and underlying operating system have limited purview into the operations that the printer driver may be attempting to perform at any time. Because the printer driver code is executed within the process of the application, any malfunction of the printer driver (e.g., an attempt to display information to the user that fails because a call to a network resource that is presently offline is not answered, because of a "for" loop that never terminates, etc.) is imparted to the application, and can cause it to crash or "hang." Because of this, printer drivers are common causes of application malfunction.

Another problem with conventional printer drivers is that they are comprised of code that is compiled prior to execution. As a result, each printer driver is specific to (i.e., usable only in) a system that employs a particular operating system and processor architecture. Thus, a printer driver used by a first portion of a user community may not be usable by a second portion of the user community that employs a different operating system and/or processor architecture. As a result, the number of different printer drivers in the marketplace is unnecessarily large.

Some embodiments of the invention address these and/or other shortcomings by providing a "printer user interface (UI) component" configured to handle presentation of information to a user during printing operations. By de-coupling the core rendering and configuration functionality of the printer driver from that which presents information to end users, and allowing a printer UI component to handle this presentation of information, embodiments of the invention may reduce the risk that applications may crash or hang due to printer driver malfunction. In some embodiments, a registry of events at which information should be presented to the user is established, and the printer UI component may be registered for some or all of these events, so that when specified events occur, the printer UI component may be invoked and present information to the user. The printer UI component may transfer any input provided by the user to appropriate components for additional processing, thereby serving as a cross-process interface.

In some embodiments, the printer UI component may comprise a standalone application. However, not all embodiments of the invention are limited to such an implementation. For example, a printer UI component may comprise one or more executables, a dynamic link library, or may be implemented using any other suitable one or more components. In some embodiments, a body of code comprising a printer UI component need not be compiled prior to execution. For example, the printer UI component may be programmed using one or more scripting languages. By removing the need to compile code comprising the printer UI component, the printer UI component may be used in a wide variety of processor architectures, and execute under any of numerous operating systems. Of course, embodiments of the invention are not limited to implementing a printer UI component in this manner, as any suitable manner of implementation may be employed.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention provide a printer UI component that presents information to the user during printing operations. For example, a registry of printing-related events at which information should be presented to the user may be established, and the printer UI component may be registered for some or all of these events. When specified events occur, the printer UI component may be invoked, by the printer driver, the operating system (e.g., the print subsystem), or one or more other components. When invoked, the printer UI component may present information to the user, and transfer any input provided by the user to appropriate components for additional processing. As such, the printer UI component may provide a cross-process interface enabling the transfer of information relating to, for example, printer device status and management. Because the printer UI component handles the presentation of printing-related information to the user, the core rendering and configuration functionality of a printer driver may be de-coupled from functionality relating to information presentation, thereby reducing the risk that an application will crash or hang due to a printer driver malfunction.

Figure 1:
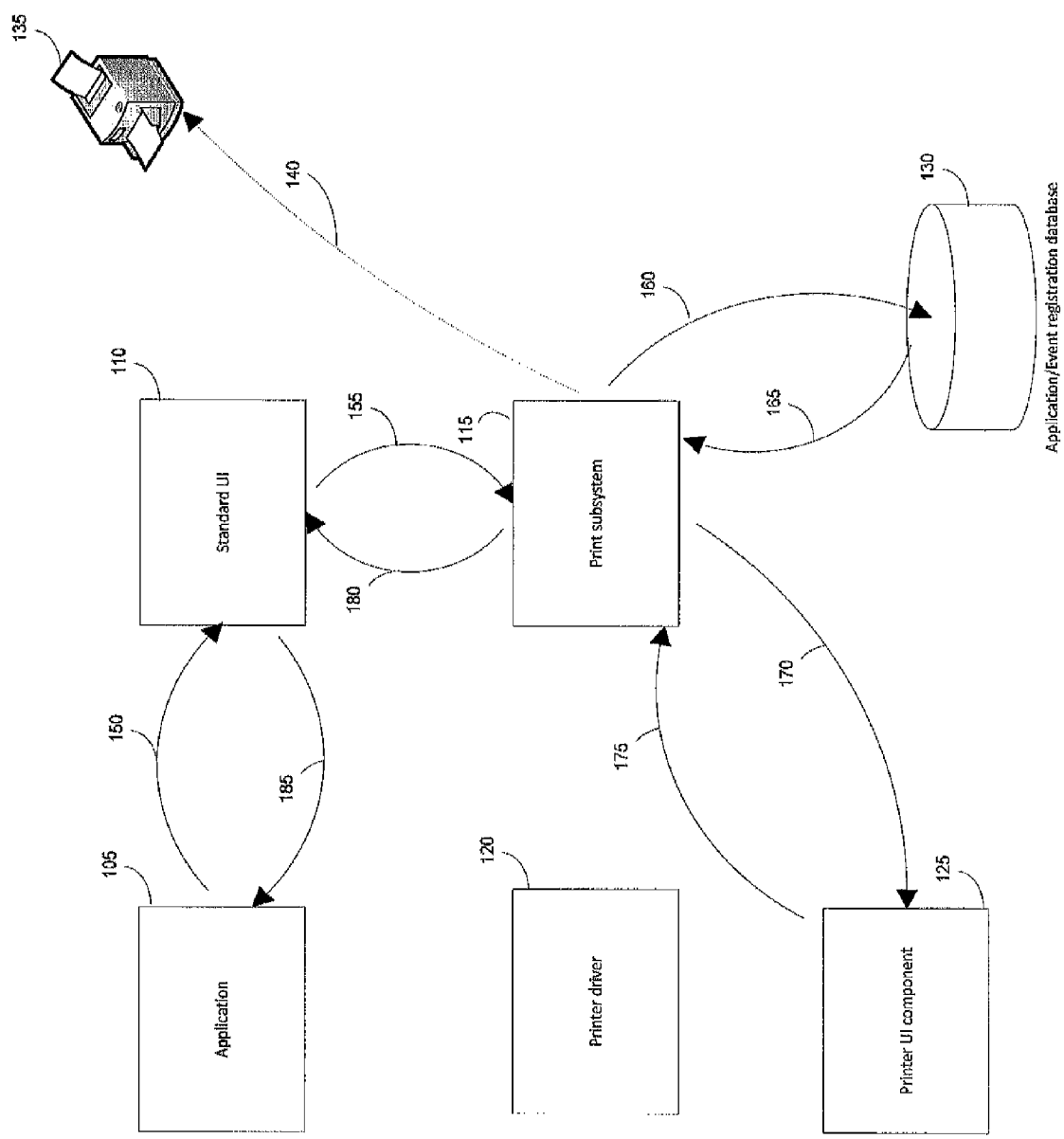
FIG. 1 is a block diagram depicting example components and techniques for enabling an end user to change print settings, in accordance with some embodiments of the invention.
Figure 2:
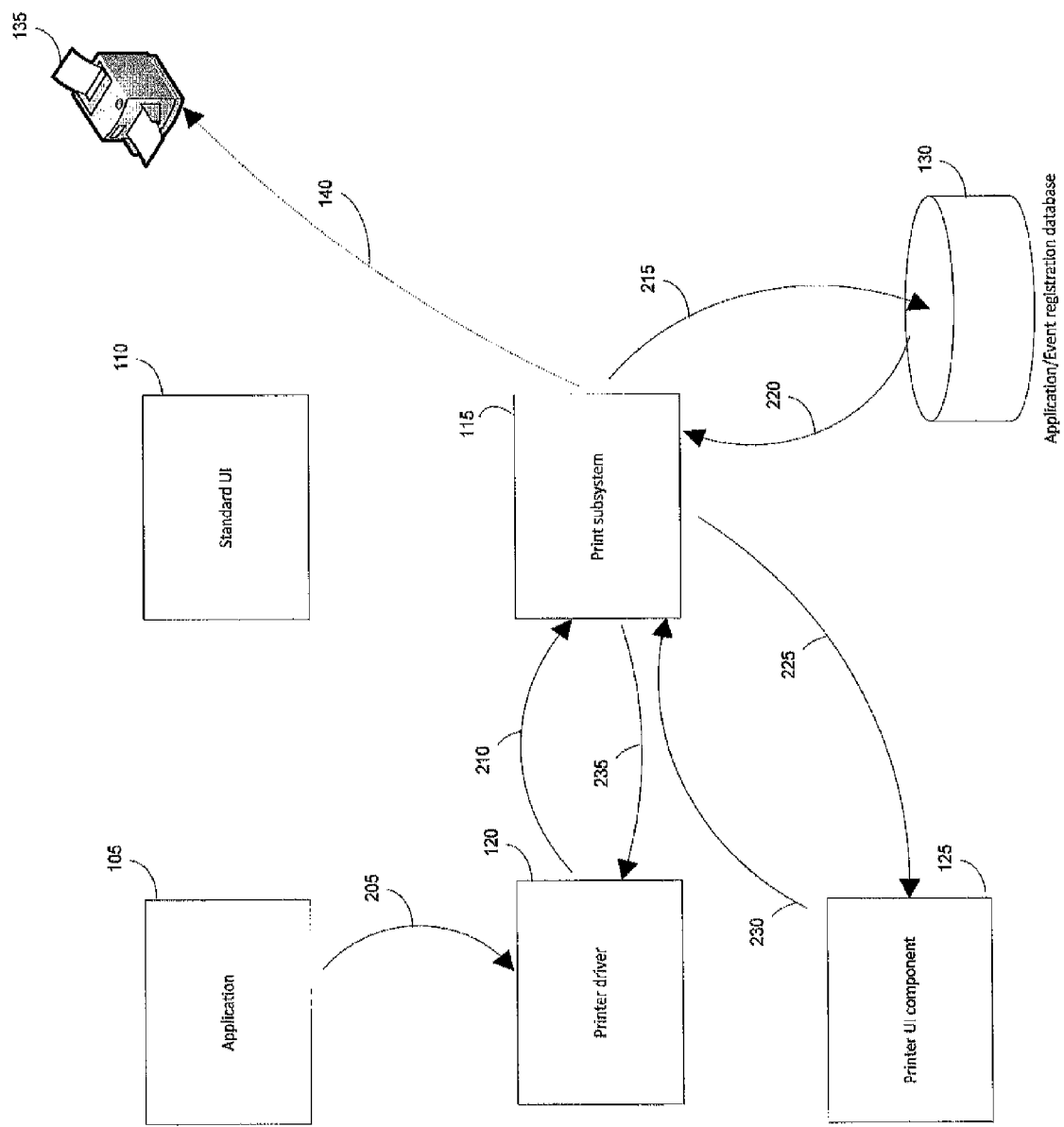
FIG. 2 is a block diagram depicting sample components and techniques which may be employed to enable an application to initiate printing, in accordance with some embodiments of the invention.
Figure 3:
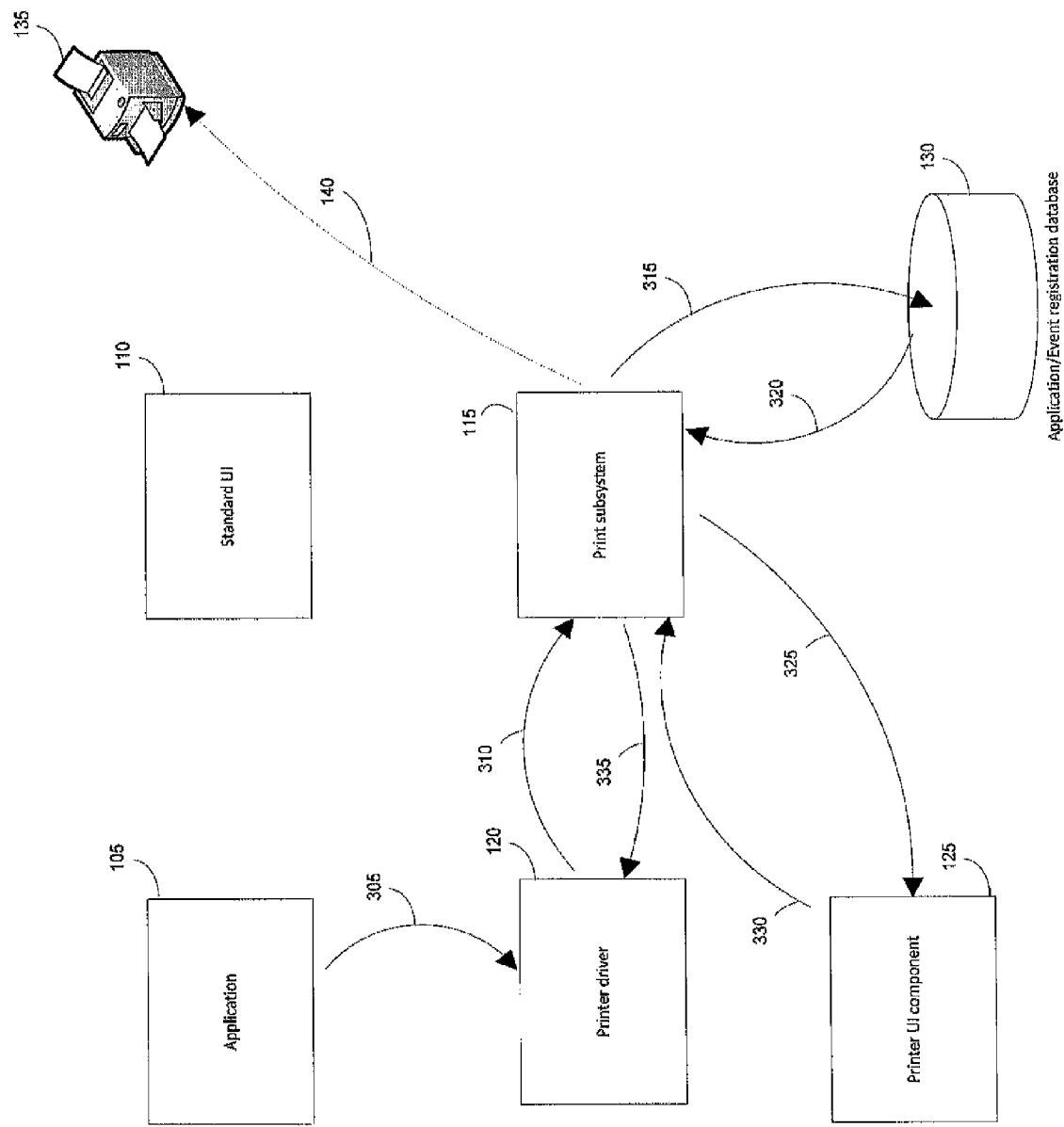
FIG. 3 is a block diagram depicting example components and techniques enabling an application to complete a print job, in accordance with some embodiments of the invention.

FIGS. 1-3 depict example scenarios during which a printer UI component may be invoked to handle presentation of printing-related information to a user. More specifically, each of FIGS. 1-3 depict an example manner in which a set of example components including an application, print subsystem of an operating system, printer UI component and printer driver interoperate and transfer information to accomplish the presentation of information to users during printing-related operations.

FIG. 1 depicts an example scenario which includes a user changing print settings, such as by initiating a print job (e.g., in certain operating systems, by clicking "File" and then "Print . . . ", or using any other manner of initiating a print job) and then indicating a desire to change print settings (e.g., by clicking "Properties" presented by a print dialogue, or using any other manner of initiating a change to print settings).

FIG. 1 depicts printer device 135, which may be any of numerous types of devices having a capability to print information (e.g., documents in a predefined page layout). Printer device 135 may be physically embodied, virtual, or be a combination thereof. Also shown is application 105, which may comprise any of numerous types of applications having a capability to initiate printing of information, such as a word processing, spreadsheet, presentation, photo management, or other type(s) of application. Although depicted separately from application 105 in FIG. 1, standard UI 110 may form part of application 105, and/or may comprise one or more stand-alone components that perform display of information relating to print operations. As an example, standard UI 110 may include components that present a print dialogue box to a user when the user indicates from within application 105 a desire to initiate printing.

Printer driver 120 comprises code enabling application 105 to invoke the functions of printer device 135. Printer driver 120 may comprise any suitable body of instructions which enables an application and/or operating system to issue instructions and information to a printing device, such as for printing according to a predefined page layout. Print subsystem 115 forms part of an operating system dedicated to managing print operations and the transfer of information between application 105 and printer driver 120.

In the example of FIG. 1, printer UI component 125 is a stand-alone component that may be invoked to present information to the user when specified events occur. However, it should be appreciated that printer UI component 125 need not comprise one or more stand-alone components, and may be implemented in any suitable fashion. For example, printer UI component 125 may alternatively form part of one or more other components depicted, such as print subsystem 115 and/or application 105. In addition, it should be appreciated that use of the term "printer UI component" does not limit embodiments of the invention to employing a single component to perform the functions disclosed herein. Printer UI component 125 may comprise any suitable number of elements, as embodiments of the invention are not limited in this respect.

At the start of the example scenario shown in FIG. 1, application 105 causes standard UI 110 to be opened, as indicated at 150. This may, for example, be the result of a user clicking "File" and then "Print . . . " within application 105, or providing other input indicating a desire to print information, which may cause a print dialogue box to be opened. However, embodiments of the invention are not limited to any specific manner of receiving user input indicating a desire to print, or interaction with the user as a result of that indication. Any one or more user actions and/or application processing may cause standard UI 110 to be opened.

Standard UI 110 then issues an instruction to print subsystem 115 to open a custom UI, as indicated at 155. This may occur, as an example, when a user clicks on "Properties" when a dialogue box comprising standard UI 110 is opened. Of course, any input indicating a desire to alter print settings may be employed, as embodiments of the invention are not limited in this respect. In some embodiments, a call is made to print subsystem 115 when such an indication is received. Of course, print subsystem 115 may be invoked in any suitable manner, which may or may not involve a call being made. In addition, print subsystem 115 need not be invoked as indicated at 155. For example, in some embodiments of the invention, standard UI 110 may communicate (e.g., directly) with registration database 130 to determine whether the opening of the custom UI is an event for which a component has registered. Embodiments of the invention are not limited to any particular manner of implementation.

In the example shown in FIG. 1, print subsystem 115 then issues a query to application/event registration database 130 to determine whether the opening of the custom UI is an event for which a component (e.g., printer UI component 125, and/or another component) has registered, as indicated at 160. In some embodiments, application/event registration database 130 may include an indication of one or more components registered to handle certain specified events. For example, the supplier of a printer driver (e.g., an independent hardware vendor that manufactures a printer device that is driven by the printer driver, and/or one or more other entities) may specify certain events upon which information should be presented to the user, such as the commencement or completion of a print job, certain error or device status conditions, etc. Any of numerous types of events may be indicated, and any of numerous types of components may be registered for each event, as embodiments of the invention are not limited in this respect. Further, it should be appreciated that any suitable repository, which may or may not comprise a database, may include indications of one or more components registered for specified events. Embodiments of the invention are not limited to any particular manner of implementation.

In the example scenario shown in FIG. 1, application/event registration database 130 indicates that printer UI component 125 has registered for the opening of the custom UI, as indicated at 165. Print subsystem 115 then invokes printer UI component 125, as indicated at 170, and provides instructions to printer UI component 125 relating to the event. For example, print subsystem 115 may provide an indication of options to be presented to a user, and allowable choices for those options. Although not shown in FIG. 1, printer UI component 125 presents these options to a user, and receives selections regarding the options. Based on the user's selections, printer UI component 125 sets context (e.g., by updating an object provided to transfer context), and provides the information to print subsystem 115, as indicated at 175. For example, if the user made a selection changing the paper size for a print job, or indicated that borderless printing should be performed, then this information may be transferred to print subsystem 115 at 175. Print subsystem 115 then provides an indication of context (e.g., the object indicating the context) to standard UI 110, as indicated at 180. Standard UI 110 may, for example, alter the manner in which printing-related information is presented (e.g., in the print dialogue box) as a result of the changes.

Standard UI 110 then provides an indication of changed context to application 105, as indicated at 185. Application 105 may, for example, use this information to determine whether the changes affect the manner in which information would be provided to printer driver 120 if printing commenced according to the user's selections. For example, the user's selection of a new paper size or borderless printing may cause the application to change information specifying the area over which an image will be rendered, prior to providing the information to printer driver 120 if printing is commenced. The example scenario of FIG. 1 then completes.

FIG. 2 depicts an example scenario wherein the user then instructs application 105 to commence printing. In this example, application 105 initiates a print job, as indicated at 205. Of course, it should be appreciated that not all embodiments may involve application 105 initiating a print job, as any suitable component(s) may initiate a print job, such as UI 110 and/or print subsystem 115. In the example shown in FIG. 2, application 105 so initiates a print job by raising an event, which is a technique whereby a request is issued to execute code that is defined for the occurrence of a specific event, although any suitable technique(s) may alternatively be employed.

As indicated at 210, printer driver 120 then indicates the raised event to print subsystem 115, whereupon print subsystem 115 queries event/application registration database 130 to determine whether a component has registered for the event, as indicated at 215. In the example scenario depicted, print subsystem 115 determines that printer UI component 125 has registered for the event, as indicated at 220, and invokes printer UI component 125, as indicated at 225. Although not shown in FIG. 2, printer UI component 125 may then present various information and/or options relating to the print job to the user. For example, printer UI component 125 may present a dialogue box that enables the user to, for example, enter a PIN for the print job, and/or provide other information. Printer UI component 125 then provides any information that is supplied to print subsystem 115 by setting context for the print job and providing the information to print subsystem 115, as indicated at 230. Print subsystem 115 then passes the information to printer driver 120, as indicated at 235. Although not depicted in FIG. 2, printer driver 120 may then issue instructions to printer device 135 to commence printing using data and/or commands provided by application 105. The example scenario shown in FIG. 2 then completes.

It should be appreciated that the example scenario depicted in FIG. 2 is merely illustrative, and that numerous variations are possible. For example, the communication indicated at 230 and 235 need not be performed, as some embodiments may provide for printer UI component 125 and/or printer driver 120 to issue instructions to printer device 135 without involvement from print subsystem 115. Any suitable processing may be performed to issue instructions to a printer device, as embodiments of the invention are not limited in this respect.

FIG. 3 depicts an example scenario whereby the user is informed of the completion of a print job submission. As in the example scenario shown in FIG. 2, application 105 raises an event indicating print job submission completion to printer driver 120, as indicated at 305, causing printer driver 120 to raise the event to print subsystem 115, as indicated at 310. Print subsystem 115 then determines whether any component has registered for the event raised by querying application/event registration database 130, as indicated at 315. In the example scenario shown, print subsystem 115 determines that printer UI component 125 has registered for the event, as indicated at 320, and invokes printer UI component 125, as indicated at 325. Although not shown in FIG. 3, invoking printer UI component 125 may cause information to be presented to the end user, such as a notification that the print job has been submitted to the printer device for printing, an indication that ink or paper supplies are low (if applicable), etc. Any of numerous types of information may be presented. If information is presented in a manner which allows the user to supply input, then an indication thereof is provided as changed context to printer subsystem 115, as indicated at 330, which then passes the information to printer driver 120, as indicated at 335. The example scenario of FIG. 3 then completes.

Also shown in each of FIGS. 1-3 is that print subsystem 115 may periodically receive information from printer device 135, such as information indicating a current status of printer device 135, as indicated at 140. For example, print subsystem 115 may periodically poll printer device 135 to determine information regarding its status, such as whether it is jammed, its ink and/or paper supplies are low, etc. In some embodiments, if an event occurs for which a component is registered (e.g., as determined by querying application/event registration database 130, then print subsystem 115 may invoke printer UI component 125 to present information relating to the event to the user. For example, various instructions may be presented to inform the user how to resolve the event.

It should be appreciated that the scenarios described above with reference to FIGS. 1-3 are merely illustrative examples, and that a printer UI component may be invoked to present information to a user in any of numerous other scenarios. Further, it should be appreciated that the components shown in FIGS. 1-3 are merely examples, as any of numerous types of components, implemented via software, hardware or a combination thereof, may alternatively be employed to process and transfer printing-related information. Embodiments of the invention are not limited to any particular implementation.

Figure 4:
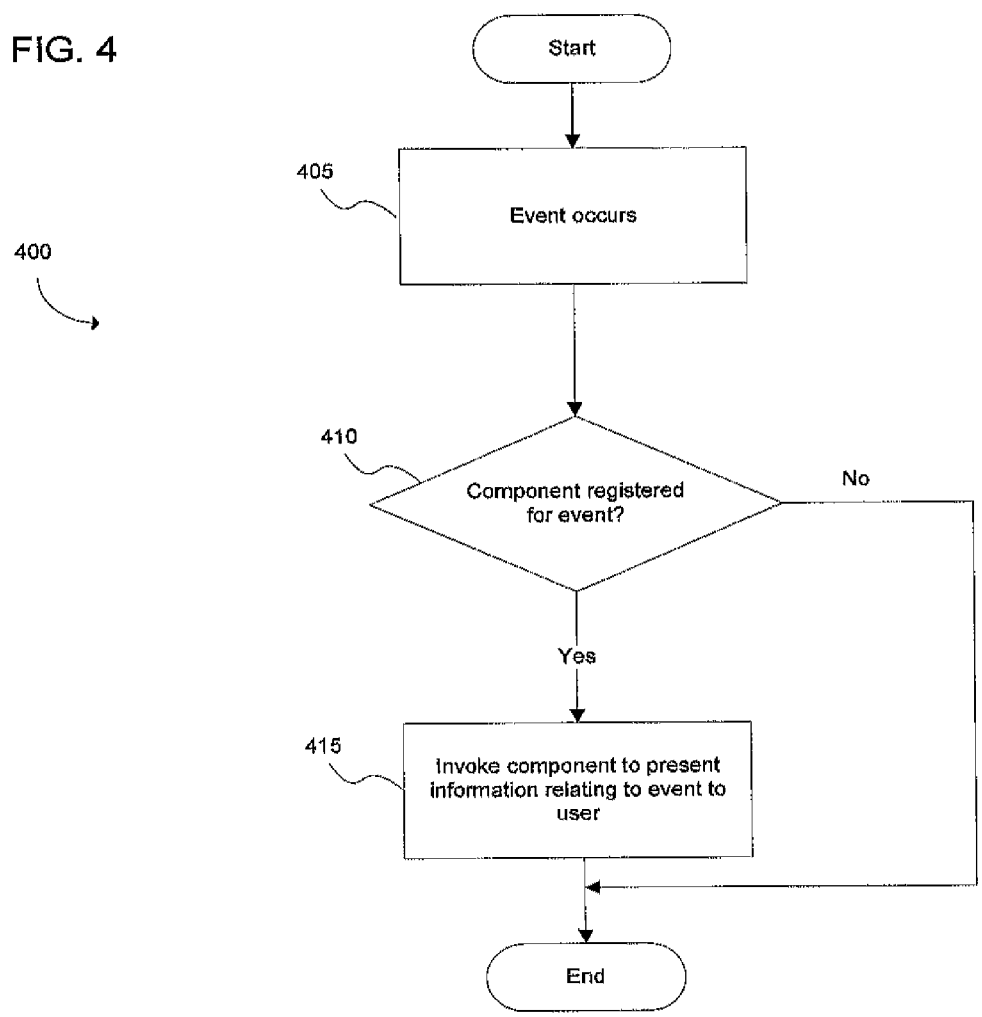
FIG. 4 is a flow chart depicting an example to the process through which a component may be invoked to cause information to be displayed to a user upon the occurrence of an event, in accordance with some embodiments of the invention.

FIG. 4 depicts an example process 400 for presenting information on printing-related operations to a user. At the start of process 400, in act 405 an event occurs, such as the initiation of a print job, the opening of a print dialogue, the completion of a print job, etc. Process 400 then proceeds to act 410, wherein a determination is made whether a component has registered for the event. For example, a database may store an indication of events for which components have been registered, and the database may be queried to determine whether a component has registered for the event. If a component has registered, process 400 then proceeds to act 415, wherein the registered component is invoked to present information relating to the event to the user. If it is determined in act 410 that no component has registered for the event, or upon the completion of act 415, process 400 completes.

Figure 5:
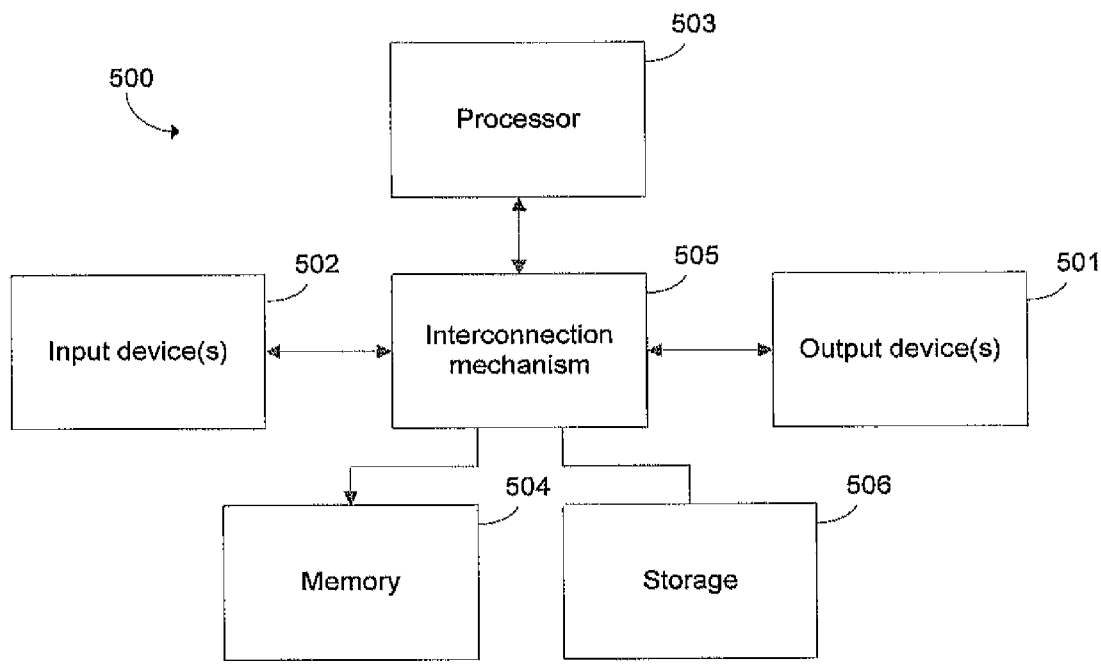
FIG. 5 is a block diagram depicting an example computer which may be employed to implement some embodiments of the invention.

Various aspects of the systems and methods for practicing features of the present invention may be implemented on one or more computer systems, such as the exemplary computer system 500 shown in FIG. 5. Computer system 500 includes input device(s) 502, output device(s) 501, processor 503, memory system 504 and storage 506, all of which are coupled, directly or indirectly, via interconnection mechanism 505, which may comprise one or more buses, switches, networks and/or any other suitable interconnection. The input device(s) 502 receive(s) input from a user or machine (e.g., a human operator), and the output device(s) 501 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 503 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Figure 6:
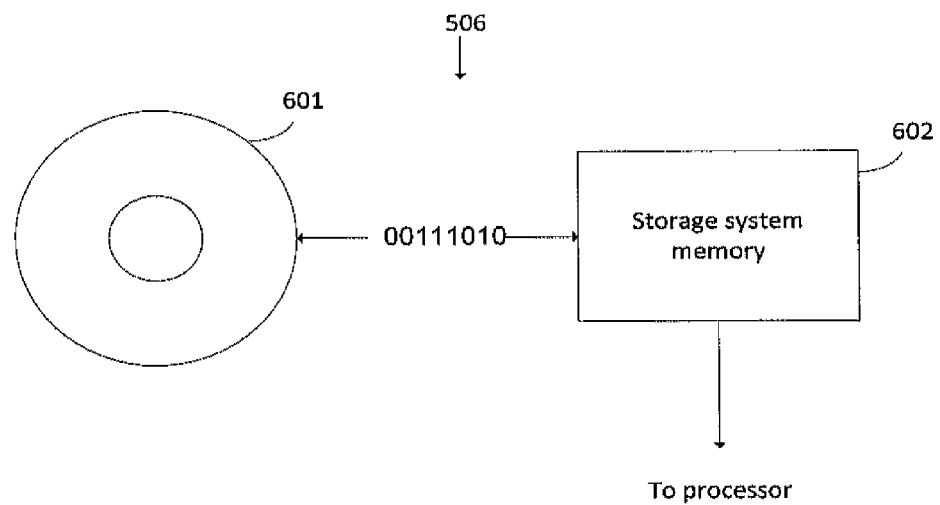
FIG. 6 is a block diagram depicting an example memory on which instructions embodying aspects of the invention may be recorded.

Processor 503 may also execute one or more computer programs to implement various functions. These computer programs may be written in any type of computer program language, including a procedural programming language, object-oriented programming language, macro language, or combination thereof. These computer programs may be stored in storage system 506. Storage system 506 may hold information on a volatile or non-volatile medium, and may be fixed or removable. Storage system 506 is shown in greater detail in FIG. 6.

Storage system 506 may include a tangible computer-readable and writable non-volatile recording medium 601, on which signals are stored that define a computer program or information to be used by the program. The recording medium may, for example, be disk memory, flash memory, and/or any other article(s) of manufacture usable to record and store information. Typically, in operation, the processor 503 causes data to be read from the nonvolatile recording medium 601 into a volatile memory 602 (e.g., a random access memory, or RAM) that allows for faster access to the information by the processor 503 than does the medium 601. The memory 602 may be located in the storage system 506 or in memory system 504, shown in FIG. 5. The processor 503 generally manipulates the data within the integrated circuit memory 504, 602 and then copies the data to the medium 601 after processing is completed. A variety of mechanisms are known for managing data movement between the medium 601 and the integrated circuit memory 504, 602, and the invention is not limited to any mechanism, whether now known or later developed. The invention is also not limited to a particular memory 504 or storage system 506.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a computing device having an operating system, an application separate from the operating system, a printer driver in communication with the operating system and with the application, and a printer device driven by the printer driver, the method comprising:
   in response to an attempt by the printer driver to provide information associated with a print job to a graphical user interface during handling of the print job by the printer driver, determining an identity of a printer user interface component that is to be invoked, wherein:
      the determining of the identity of the printer user interface component is based on pre-established associations stored in a repository of links between particular events and components for handling the particular events, and
      the identified printer user interface component is separate from the operating system, separate from the application, and separate from the printer driver; and
   using the identified printer user interface component to cause the information associated with the print job to be displayed in the graphical user interface.

2. The method of claim 1, wherein the printer user interface component comprises another application.

3. The method of claim 1, wherein the printer user interface component comprises a body of code written in a scripting language.

4. The method of claim 1, wherein:
   the information associated with the print job relates to a printing event triggered by the print job;
   the repository stores:
      an indication that the printer user interface component is to be invoked for occurrences of the printing event triggered by the print job; and
      another indication that another component is to be invoked for the occurrence of another printing event when triggered by another print job; and
   the determining of the identity of the printer user interface component includes:
      querying the repository for the indication that the printer user interface component is to be invoked for occurrences of the printing event triggered by the print job.

5. The method of claim 1, wherein the identified printer user interface component:

receives the information associated with a print job from at least one of the operating system, the application, or the printer driver;

causes the information associated with the print job to be displayed in the graphical user interface;

receives user input in response to the information associated with the print job; and passes the user input to at least one of the operating system, the application, or the printer driver.

6. The method of claim 5, wherein the user input provides context for a printing event triggered by the print job.

7. The method of claim 1, wherein the information that is caused to be displayed includes a status of the printer device.

8. At least one computer-readable medium, not comprising a signal per se, having instructions stored thereon which, in response to execution by a computing device, cause the computing device to perform operations, the operations comprising:

in response to an occurrence of a first printing event triggered as part of a handling a request to print a print job, querying a repository, that stores indications of components registered for printing events, for an identity of a first component registered for at least partially handling the first printing event; and using the first component to cause information relating to the print job to be displayed, the first component being separate from an operating system of the computing device and from a printer driver for the printer device.

9. The at least one computer-readable medium of claim 8, wherein the first component comprises a standalone executable that is separate from an application that initiated the print job.

10. The at least one computer-readable medium of claim 8, wherein the first component comprises a script.

11. The at least one computer-readable medium of claim 8, wherein the first printing event is an event raised by the operating system, an application, or the printer driver.

12. The at least one computer-readable medium of claim 8, wherein the first component:

receives information associated with the print job from at least one of the operating system, the application, or the printer driver;

causes the information associated with the print job to be displayed;

receives user input in response to the information associated with the print job; and passes the user input to at least one of the operating system, the application, or the printer driver.

13. The at least one computer-readable medium of claim 12, wherein the user input provides context for the first printing event.

14. The at least one computer-readable medium of claim 8, wherein the first printing event is based on a status of the printer device with respect to the print job.

15. A system, comprising:

a storage device that stores an operating system, an application separate from the operating system, and a printer driver that drives a printer and that communicates with the operating system and with the application; and at least one processor that:

in response to an occurrence of a printing event caused by a status of a printing of a print job by the printer, determines an identity of a particular component that is to be invoked to display information relating to the status of the printing of the print job by the printer;

invokes the identified component; and displays, via use of the identified component, information relating to the status of the printing of the print job by the printer.

16. The system of claim 15, wherein the identified component comprises a standalone executable application.

17. The system of claim 15, wherein the identified component is in a scripting language.

18. The system of claim 15, wherein the use of the identified component comprises:

receiving information associated with the print job from at least one of the operating system, the application, or the printer driver;

causing information associated with the print job to be displayed;

receiving user input in response to the information associated with the print job; and passing the user input to at least one of the operating system, the application, or the printer driver.

19. The system of claim 18, wherein the user input provides context for the printing event.

20. The system of claim 18, wherein the information associated with the print job represents a request to obtain a PIN number, and wherein the user input includes the PIN number.

* * * * *